United States Patent
Fan et al.

(10) Patent No.: US 9,442,845 B2
(45) Date of Patent: Sep. 13, 2016

(54) ENCODING A DATA ADDRESS USING XOR OPERATION WHEREIN ADDRESS BITS ARE TRANSFORMED BY MULTIPLE PRESET POLYNOMIALS

(71) Applicant: HUAWEI TECHNOLOGIES CO., LTD., Shenzhen (CN)

(72) Inventors: Chunlei Fan, Chengdu (CN); Wenhua Du, Shenzhen (CN); Zixue Bi, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 170 days.

(21) Appl. No.: 14/092,213

(22) Filed: Nov. 27, 2013

(65) Prior Publication Data
US 2014/0089633 A1    Mar. 27, 2014

Related U.S. Application Data

(63) Continuation of application No. PCT/CN2011/075114, filed on Jun. 1, 2011.

(51) Int. Cl.
| | |
|---|---|
| *G06F 12/00* | (2006.01) |
| *G06F 13/00* | (2006.01) |
| *G06F 13/28* | (2006.01) |
| *G06F 17/15* | (2006.01) |
| *G06F 12/06* | (2006.01) |
| *G06F 12/02* | (2006.01) |
| *G06F 21/12* | (2013.01) |
| *G06F 21/14* | (2013.01) |
| *G06F 12/14* | (2006.01) |

(52) U.S. Cl.
CPC ......... *G06F 12/063* (2013.01); *G06F 12/0223* (2013.01); *G06F 17/156* (2013.01); *G06F 12/1408* (2013.01); *G06F 17/15* (2013.01); *G06F 21/12* (2013.01); *G06F 21/14* (2013.01)

(58) Field of Classification Search
None
See application file for complete search history.

(56) References Cited

U.S. PATENT DOCUMENTS

| | | | |
|---|---|---|---|
| 6,370,611 B1 * | 4/2002 | Callison et al. | 711/105 |
| 6,460,159 B1 | 10/2002 | Kim et al. | |
| 2003/0182491 A1 * | 9/2003 | Chudnovsky et al. | 711/5 |

FOREIGN PATENT DOCUMENTS

| | | |
|---|---|---|
| CN | 1855733 A | 11/2006 |
| CN | 101640543 A | 2/2010 |
| CN | 101854230 A | 10/2010 |

* cited by examiner

*Primary Examiner* — Jared Rutz
*Assistant Examiner* — Marwan Ayash
(74) *Attorney, Agent, or Firm* — Brinks Gilson & Lione

(57) ABSTRACT

The present invention relates to the field of communication technologies and discloses a method and an apparatus for encoding a data address, so that attacks can be effectively prevented and resources and costs required to handle a bank conflict are reduced. In solutions provided by embodiments of the present invention, an exclusive-OR operation is performed on one or more bits of a received uncoded address by using multiple preset transform polynomials; and an encoded address is obtained according to a result of the exclusive-OR operation. The solutions provided by the embodiments of the present invention are applicable to designs that require a large-capacity DRAM, high performance and high reliability, and have an anti-attack demand.

5 Claims, 2 Drawing Sheets

| in→ | | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|
| Out16 | = | | | | | | | | | | √ | | √ | | √ | √ | √ | √ |
| Out15 | = | | | | | | | | | √ | | √ | | √ | √ | √ | √ | |
| Out14 | = | | | | | | | | √ | | √ | | √ | √ | √ | √ | | |
| Out13 | = | | | | | | | √ | | √ | | √ | √ | √ | √ | | | |
| Out12 | = | | | | | | √ | | √ | | √ | √ | √ | √ | | | | |
| Out11 | = | | | | | √ | | √ | | √ | √ | √ | √ | | | | | |
| Out10 | = | | | | √ | | √ | | √ | √ | √ | √ | | | | | | |
| Out9 | = | | | √ | | √ | | √ | √ | √ | √ | | | | | | | |
| Out8 | = | | √ | | √ | | √ | √ | √ | √ | | | | | | | | |
| Out7 | = | √ | | √ | | √ | √ | √ | √ | | | | | | | | | |
| Out6 | = | | √ | | √ | √ | √ | √ | | | √ | | √ | | √ | √ | √ | √ |
| Out5 | = | √ | | √ | √ | √ | √ | | | √ | | √ | | √ | √ | √ | √ | |
| Out4 | = | | √ | √ | √ | √ | | | √ | | | | | √ | | | √ | √ |
| Out3 | = | √ | √ | √ | √ | | | √ | | | | | √ | | | √ | √ | |
| Out2 | = | √ | √ | √ | | | √ | | | | √ | √ | √ | | | | √ | √ |
| Out1 | = | √ | √ | | | √ | | √ | | | √ | √ | | | √ | | | √ |
| Out0 | = | √ | | | √ | | | | √ | | | √ | √ | | √ | √ | | √ |

FIG. 4

ENCODING A DATA ADDRESS USING XOR OPERATION WHEREIN ADDRESS BITS ARE TRANSFORMED BY MULTIPLE PRESET POLYNOMIALS

CROSS-REFERENCE TO RELATED APPLICATIONS

This application is a continuation of International Application No. PCT/CN2011/075114, filed on Jun. 1, 2011, which is hereby incorporated by reference in its entirety.

TECHNICAL FIELD

The present invention relates to the field of communication technologies, and in particular, to a method and an apparatus for encoding a data address.

BACKGROUND

To save areas and costs, a high-end communication chip generally uses an eDRAM (embedded dynamic random access memory, embedded dynamic random access memory); and a pseudo two-port (PTP) eDRAM of IBM (International Business Machines Corporation, International Business Machines Corporation) is generally used as a memory storing a QIT (Queue Information Table, queue information table). However, when a bank (bank) conflict occurs on the PTP, performance is reduced. If no bank conflict occurs on the PTP, a write bandwidth of 600 Mpps and a read bandwidth of 600 Mpps can be reached, and the total bandwidth is 1200 Mpps. However, if a bank conflict occurs on the PTP, the total bandwidth in a worst circumstance may be 300 Mpps, which obviously affects the system performance seriously. In the prior art, the bank conflict is handled in the following manner:

A bank address is separated from an uncoded total address, and the bank address is sent to an embedded SRAM (Static RAM, static RAM); the SRAM stores a table in which uncoded addresses correspond to encoded addresses on a one-to-one basis, where the uncoded addresses and the encoded addresses exist in the form of specific addresses in the SRAM and are represented by binary numbers, that is, the uncoded address can indicate not only the bank address, but also the uncoded total address, and the encoded address can indicate not only the bank address, but also an encoded total address; a corresponding encoded bank address is obtained through query according to the uncoded bank address sent to the SRAM, and the encoded total address is obtained upon address aggregation. The uncoded total address includes the bank address.

However, in the prior art, when a bank conflict is handled, the bit width of the bank address is five bits at most, featuring a small bit width and obvious periodicity. As a result, the encoded total address regularly belongs to the same bank, which causes poor anti-attack and anti-interference capabilities. In addition, when a table in the SRAM is queried, a $2^N*N$ (N indicates the number of bits) bit capacity of the SRAM needs to be occupied, thereby requiring a lot of resources and high costs.

SUMMARY

Embodiments of the present invention provide a method and an apparatus for encoding a data address, so that attacks can be effectively prevented and resources and costs required to handle a bank conflict are reduced.

To achieve the foregoing objectives, the embodiments of the present invention adopt the following technical solutions:

A method for encoding a data address includes:

receiving an uncoded address;

performing an exclusive-OR operation on one or more bits of the uncoded address by using multiple preset transform polynomials, where the multiple preset transform polynomials correspond to multiple bits of an encoded address on a one-to-one basis; and obtaining the encoded address according to a result of the exclusive-OR operation.

An apparatus for encoding a data address includes:

a receiving unit, configured to receive an input uncoded address;

a logic deducing module, configured to perform an exclusive-OR operation on one or more bits of the uncoded address by using multiple preset transform polynomials, and obtain an encoded address according to a result of the exclusive-OR operation, where the multiple preset transform polynomials correspond to multiple bits of the encoded address on a one-to-one basis.

In the method and apparatus for encoding a data address provided by the embodiments of the present invention, an exclusive-OR operation is performed on one or more bits of a received uncoded address by using multiple preset transform polynomials, and an encoded address is obtained according to a result of the exclusive-OR operation. In the prior art, when a bank conflict is handled, a table is queried according to a one-to-one relationship between uncoded addresses and encoded addresses; as a result, an encoded total address regularly belongs to the same bank, which causes poor anti-attack and anti-interference capabilities. In comparison, by using the solutions provided in the embodiments of the present invention, when a bank conflict is handled, an address transform is performed on the uncoded address according to the preset transform polynomials, and the obtained encoded address is irregular, which can effectively prevent attacks.

In addition, in the solutions provided in the embodiments of the present invention, if the uncoded address is N bits, resources required to perform an address transform on the N-bit uncoded address are N*N bits. Compared with the prior art where a $2^N*N$ (N indicates the number of bits) bit capacity of an SRAM needs to be occupied when a table in the SRAM is queried, the solutions provided in the embodiments of the present invention need fewer resources and lower costs.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from the accompanying drawings without creative efforts.

FIG. 4 is a chart of preset transform polynomials according to Embodiment 2 of the present invention.

DESCRIPTION OF EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
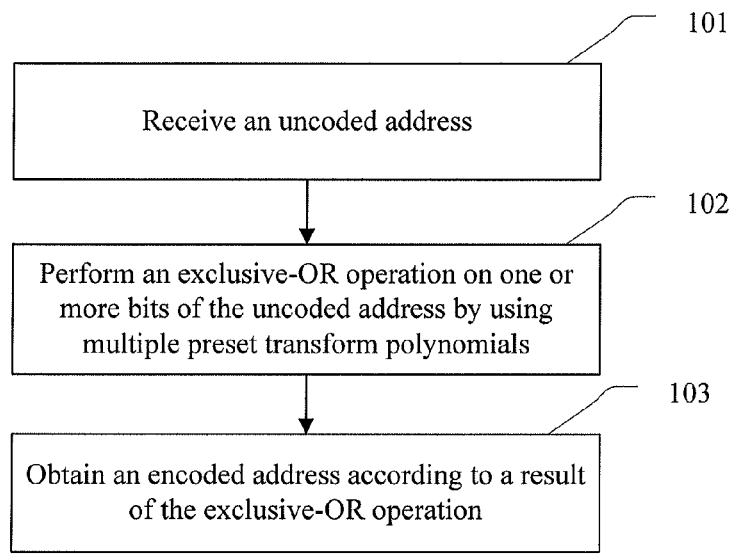
FIG. 1 is a flowchart of a method for encoding a data address according to Embodiment 1 of the present invention.

The embodiment provides a method for encoding a data address. As shown in FIG. 1, the method includes:

Step 101: Receive an uncoded address.

Step 102: Perform an exclusive-OR operation on one or more bits of the uncoded address by using multiple preset transform polynomials, where the multiple preset transform polynomials correspond to multiple bits of an encoded address on a one-to-one basis.

Step 103: Obtain an encoded address according to a result of the exclusive-OR operation.

Figure 2:
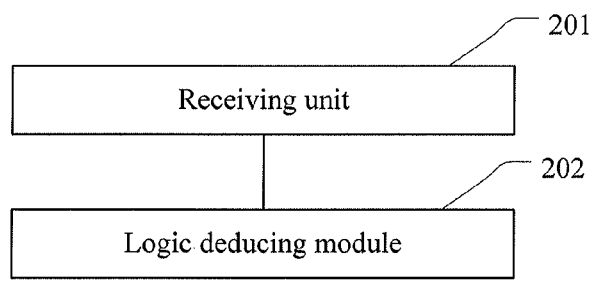
FIG. 2 is a block diagram of an apparatus for encoding a data address according to Embodiment 1 of the present invention.

To implement the foregoing method for encoding a data address, the present invention further provides an apparatus for encoding a data address. As shown in FIG. 2, the apparatus includes a receiving unit 201 and a logic deducing module 202.

The, receiving unit 201 is configured to receive an input uncoded address.

The logic deducing module 202 is configured to perform an exclusive-OR operation on one or more bits of the uncoded address by using multiple preset transform polynomials, and obtain an encoded address according to a result of the exclusive-OR operation, where the multiple preset transform polynomials correspond to multiple bits of the encoded address on a one-to-one basis.

In the method and apparatus for encoding a data address according to the embodiment of the present invention, a logic deducing module selects different transform polynomials from multiple preset transform polynomials, and performs an exclusive-OR operation on one or more bits of an input uncoded address to obtain an encoded address. It can be seen from experimental data that the obtained encoded address is random. In the prior art, when a bank conflict is handled, a one-to-one relationship exists between uncoded addresses and encoded addresses; an encoded total address obtained by querying a table regularly belongs to the same bank, which causes poor anti-attack and anti-interference capabilities. In comparison, by using the solution provided in the embodiment of the present invention, when a bank conflict is handled, an address transform is performed on the uncoded address according to the preset transform polynomials, and the obtained encoded address is irregular, which can effectively prevent attacks.

In addition, in the solution provided in the embodiment of the present invention, if the uncoded address is N bits, resources required to perform an address transform on the N-bit uncoded address are N*N bits. Compared with the prior art where a $2^N*N$ (N indicates the number of bits) bit capacity of an SRAM needs to be occupied when a table in the SRAM is queried, the solution provided in the embodiment of the present invention needs fewer resources and lower costs.

Embodiment 2

A solution provided in the embodiment of the present invention is described based on an assumption that an eDRAM (embedded dynamic random access memory, embedded dynamic random access memory) stores 128K QITs (Queue Information Table, queue information table) and a QID (Queue Identification, a specific entry in the queue information) is 17 bits, where the QID indicates an address of the specific entry in the QIT. It should be noted that a random encoding method provided by the present invention may determine the number of used eDRAMs according to an actual requirement, so that the applicable scope of the present invention may be extended to any number of bits. In the present invention, the eDRAM, or a DRAM (Dynamic Random Access Memory, dynamic random access memory) or a DDR (Double Data Rate, double data rate) synchronous dynamic random access memory may be used.

The embodiment provides a method for encoding a data address. Refer to FIG. 1, which is a flowchart of the method for encoding a data address. The method specifically includes:

Step 101: Receive an uncoded address.

Specifically, a system may receive an input N-bit uncoded address, where the N may be any natural number, so as to perform random encoding on an uncoded address of a super large capacity and an uncoded address of a smaller capacity to obtain an encoded address.

For example, the present invention is described by using a 17-bit uncoded address as an example, that is, the uncoded QID is 17 bits. The low three bits of the uncoded address determine an eDRAM to which the QID belongs, that is, the $0^{th}$ bit, the first bit, and the second bit of the uncoded QID determine an eDRAM to which the QID belongs. For example, if the uncoded QID is 00000000001100110, the QID belongs to the sixth eDRAM.

The next low four bits of the uncoded address determine a bank to which the QID belongs, that is, the third bit, the fourth bit, the fifth bit, and the sixth bit of the uncoded QID determine a bank to which the QID belongs. For example, if the uncoded QID is 00000000001100110, the QID belongs to the twelfth bank.

When the uncoded address is 10 bits, the low three bits of the uncoded address determine an eDRAM to which the QID belongs, that is, the $0^{th}$ bit, the first bit, and the second bit of the uncoded QID determine an eDRAM to which the QID belongs. For example, if the uncoded QID is 0001100110, the QID belongs to the sixth eDRAM. The next low four bits of the uncoded address determine a bank to which the QID belongs, that is, the third bit, the fourth bit, the fifth bit, and the sixth bit of the uncoded QID determine a bank to which the QID belongs. For example, if the uncoded QID is 0001100110, the QID belongs to the twelfth bank.

Step 102: Perform an exclusive-OR operation on one or more bits of the uncoded address by using multiple preset transform polynomials, where the multiple preset transform polynomials correspond to multiple bits of the encoded address on a one-to-one basis.

A logic deducing module is configured to perform an exclusive-OR operation on one or more bits of received multiple uncoded addresses to obtain a random encoded address. The logic deducing module includes M N-bit register arrays, where the M N-bit register arrays are statically configured according to the multiple preset transform polynomials, M is a natural number greater than 0, N is a natural number greater than 0, and M is equal to N, that is, an N-bit uncoded address needs to correspond to an N-bit encoded address.

Figure 3:
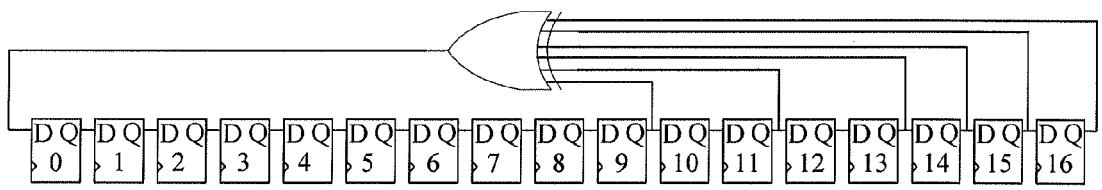
FIG. 3 is a schematic diagram of a logic deducing circuit according to Embodiment 2 of the present invention.

The preset transform polynomial may be as follows:
out=$in^{16}+in^{15}+in^{14}+in^{13}+in^{11}+in^{9}+I$, where, in indicates an input variable and out indicates an output variable. Specifically, by deducing with a logic deducing circuit illustrated in FIG. 3, the following simplified 17 preset transform polynomials may be obtained, including:

out16=in9^in11^in13^in14^in15^in16;
out15=in8^in10^in12^in13^in14^in15;
out14=in7^in9^in11^in12^in13^in14;
out13=in6^in8^in10^in11^in12^in13;
out12=in5^in7^in9^in10^in11^in12;
out11=in4^in6^in8^in9^in10^in11;
out10=in3^in5^in7^in8^in9^in10;
out9=in2^in4^in6^in7^in8^in9;
out8=in1^in3^in5^in6^in7^in8;
out7=in0^in2^in4^in5^in6^in7;
out6=in1^in3^in4^in5^in6^in9^in11^in13^in14 ^in15^in16;
out5=in0^in2^in3^in4^in5^in8^in10^in12^in13^in14^in15;
out4=in1^in2^in3^in4^in7^in12^in15^in16;
out3=in0^in1^in2^in3^in6^in11^in14^in15;
out2=in0^in1^in2^in5^in9^in10^in11^in15^in16;
out1=in0^in1^in4^in6^in8^in10^in11^in13^in 16; and
out0=in0^in3^in7^in10^in11^in13^in14^in16, where Out I indicates an output value of an $I^{th}$ bit, a value of the I ranges from 0 to 16, in J indicates an input value of a $J^{th}$ bit, a value of the J ranges from 0 to 16, and the output variable and the input variable are represented in binary notation.

The simplified 17 preset transform polynomials may be converted into a chart, as shown in FIG. 4. When the 17-bit uncoded address is input, output values of the encoded address may be obtained successively from higher bits to lower bits. For example, when the output value of the highest bit out 16 is obtained, an exclusive-OR operation is performed on the $9^{th}$ bit, the $11^{th}$ bit, the $13^{th}$ bit, the $14^{th}$ bit, the $15^{th}$ bit, and the $16^{th}$ bit of the input uncoded address in sequence, and the obtained result of exclusive-OR operation is the output value of the $16^{th}$ bit of the encoded address. Similarly, output values of other bits can be obtained in sequence.

The statically configured M N-bit register arrays may be statically configured according to the simplified 17 logic expressions, where M is equal to N. In the present invention, M N-bit resources are needed in an address transform, that is, resources of 17*17=289 bits are needed. In the present invention, the M N-bit register arrays are highly configurable, and the statically configured M N-bit register arrays provide a good interface.

The multiple preset transform polynomials are statically configured on the M N-bit register arrays in the logic deducing module.

Step 303: Obtain an encoded address according to a result of the exclusive-OR operation.

The 289-bit register is configured statically; and the logic deducing module selects different transform polynomials from multiple preset transform polynomials according to the obtained uncoded address, and performs an exclusive-OR operation on bits of the multiple uncoded addresses to generate random encoded addresses on a one-to-one mapping basis. The encoded address is 17 bits, that is, the encoded QID is 17 bits; the low three bits of the encoded address determine an eDRAM to which the QID belongs, and the next low four bits of the uncoded address determine a bank to which the QID belongs.

Experiments are performed according to the solution provided in the embodiment of the present invention to obtain the following experimental data table:

| Uncoded Address | | | Encoded Address | | |
|---|---|---|---|---|---|
| QID | eDRAM | bank | QID | eDRAM | bank |
| 0 | 0 | 0 | 0 | 0 | 0 |
| 1 | 1 | 0 | 175 | 7 | 5 |
| 2 | 2 | 0 | 350 | 6 | 11 |
| 3 | 3 | 0 | 497 | 1 | 14 |
| 4 | 4 | 0 | 700 | 4 | 7 |
| 5 | 5 | 0 | 531 | 3 | 2 |
| 6 | 6 | 0 | 994 | 2 | 12 |
| 7 | 7 | 0 | 845 | 5 | 9 |
| 8 | 0 | 1 | 1401 | 1 | 15 |
| 9 | 1 | 1 | 1494 | 6 | 10 |
| 10 | 2 | 1 | 1063 | 7 | 4 |
| 11 | 3 | 1 | 1160 | 0 | 1 |
| 12 | 4 | 1 | 1989 | 5 | 8 |
| 13 | 5 | 1 | 1898 | 2 | 13 |
| 14 | 6 | 1 | 1691 | 3 | 3 |
| 15 | 7 | 1 | 1588 | 4 | 6 |
| 16 | 0 | 2 | 2802 | 2 | 14 |

It can be seen from the above experimental data table that the banks to which the uncoded addresses belong are distributed regularly, while the banks to which the encoded addresses belong are completely distributed at random when the solution provided in the embodiment of the present invention is adopted. In this way, attacks can be effectively prevented.

In addition, the selecting different polynomials from multiple preset transform polynomials and performing an exclusive-OR operation on the bits of the multiple uncoded addresses by the logic deducing module are implemented by fixing the multiple preset transform polynomials on specific hardware.

Specifically, the simplified 17 preset transform polynomials are compiled into an executable program by using a computer language, and the program is fixed on specific hardware, where the specific hardware may be a logic gate circuit that can store 17*17 register arrays and perform a logic transform. The hardware is directly used upon power-on, and an encoded address may be obtained according to the input N-bit uncoded address, so that attacks are effectively prevented.

In the present invention, multiple transform polynomials may also be used; by using the transform polynomials, an encoded address may be obtained according to an input N-bit uncoded address and the encoded address is no longer regular. The multiple transform polynomials are fixed on specific hardware; specific selection software, which may be a register array, may be used to control the specific hardware; when an address transform is performed, the specific selection software selects a transform polynomial according to a random effect, and an encoded address is obtained according to the input N-bit uncoded address. A specific algorithm may also be used to select a transform polynomial, where the specific algorithm can meet any number of transform polynomials. Specifically, the specific algorithm may be an LFSR (Linear Feedback Shift Register, linear feedback shift register) algorithm.

In the method for encoding a data address according to the embodiment of the present invention, an exclusive-OR operation is performed on one or more bits of a received uncoded address by using multiple preset transform polynomials to obtain an encoded address. Resources needed to perform an address transform on the N-bit uncoded address are N*N bits. Compared with the prior art where a $2^N*N$ bit capacity of an SRAM needs to be occupied when a table in the SRAM is queried, the solution provided in the embodiment of the present invention needs fewer resources and lower costs.

In addition, it can be seen from the experimental data that encoded addresses obtained by using the solution provided in the embodiment of the present invention are random. In the prior art, when a bank conflict is handled, a table is queried according to a one-to-one relationship between uncoded addresses and encoded addresses. As a result, an encoded total address regularly belongs to the same bank, which causes poor anti-attack and anti-interference capabilities. In comparison, by using the solution provided in the embodiment of the present invention, when a bank conflict is handled, an address transform is performed on the N-bit uncoded address according to preset transform polynomials, and the obtained encoded addresses on a one-to-one mapping basis are irregular, which can effectively prevent attacks.

To implement the foregoing method for encoding a data address, the present invention further provides an apparatus for encoding a data address. As shown in FIG. 2, the apparatus is specifically as follows:

A receiving unit 201 is configured to receive an uncoded address.

A system may receive an input N-bit uncoded address, where the N may be any natural number, so as to perform random encoding on an uncoded address of a super large capacity and an uncoded address of a smaller capacity to obtain an encoded address.

For example, in the present invention, the uncoded address may be 17 bits, that is, an uncoded QID is 17 bits. The low three bits of the uncoded address determine an eDRAM to which the QID belongs, that is, the $0^{th}$ bit, the first bit, and the second bit of the uncoded QID determine an eDRAM to which the QID belongs. For example, if the uncoded QID is 00000000001100110, the QID belongs to the sixth eDRAM.

The next low four bits of the uncoded address determine a bank to which the QID belongs, that is, the third bit, the fourth bit, the fifth bit, and the sixth bit of the uncoded QID determine a bank to which the QID belongs. For example, if the uncoded QID is 00000000001100110, the QID belongs to the twelfth bank.

When the uncoded address is 10 bits, the low three bits of the uncoded address determine an eDRAM to which the QID belongs, that is, the $0^{th}$ bit, the first bit, and the second bit of the uncoded QID determine an eDRAM to which the QID belongs. For example, if the uncoded QID is 0001100110, the QID belongs to the sixth eDRAM. The next low four bits of the uncoded address determine a bank to which the QID belongs, that is, the third bit, the fourth bit, the fifth bit, and the sixth bit of the uncoded QID determine a bank to which the QID belongs. For example, if the uncoded QID is 0001100110, the QID belongs to the twelfth bank.

A logic deducing module 202 is configured to perform an exclusive-OR operation on one or more bits of the uncoded address by using multiple preset transform polynomials, and obtain an encoded address according to a result of the exclusive-OR operation, where the multiple preset transform polynomials correspond to multiple bits of the encoded address on a one-to-one basis.

When the uncoded address is 17 bits, the multiple preset transform polynomials include the following:

out16=in9^in11^in13^in14^in15^in16;
out15=in8^in10^in12^in13^in14^in15;
out14=in7^in9^in11^in12^in13^in14;
out13=in6^in8^in10^in11^in12^in13;
out12=in5^in7^in9^in10^in11^in12;
out11=in4^in6^in8^in9^in10^in11;
out10=in3^in5^in7^in8^in9^in10;
out9=in2^in4^in6^in7^in8^in9;
out8=in1^in3^in5^in6^in7^in8;
out7=in0^in2^in4^in5^in6^in7;
out6=in1^in3^in4^in5^in6^in9^in11^in13^in14^in15^in16;
out5=in0^in2^in3^in4^in5^in8^in10^in12^in13^in14^in15;
out4=in1^in2^in3^in4^in7^in12^in15^in16;
out3=in0^in1^in2^in3^in6^in11^in14^in15;
out2=in0^in1^in2^in5^in9^in10^in11^in15^in16;
out1=in0^in1^in4^in6^in8^in10^in11^in13^in 16; and
out0=in0^in3^in7^in10^in11^in13^in14^in16, where Out I indicates an output value of an $I^{th}$ bit, a value of the I ranges from 0 to 16, in J indicates an input value of a $J^{th}$ bit, a value of the J ranges from 0 to 16, and the output variable and the input variable are represented in binary notation.

The multiple preset transform polynomials are statically configured on M N-bit register arrays in the logic deducing module, where M is a natural number greater than 0, N is a natural number greater than 0, and the M is equal to the N.

The logic deducing module includes M N-bit register arrays, where the M register arrays correspond to N bits of the encoded address on a one-to-one basis; and the register arrays are configured to select a corresponding preset transform polynomial from the multiple preset transform polynomials, perform an exclusive-OR operation on one or more bits of the uncoded address, and output a result of the exclusive-OR operation.

The M register arrays include N registers respectively, where the registers included in each register array correspond to the bits of the uncoded address on a one-to-one basis; and the registers in the M register arrays are configured to store corresponding bits of the uncoded address, and output a result of the exclusive-OR operation according to the corresponding preset transform polynomial.

Specifically, the present invention is described based on an assumption that resources of 17*17=289 bits are needed. According to received uncoded addresses, the statically configured 289-bit register array selects different transform polynomials from the multiple preset polynomials, and performs an exclusive-OR operation on bits of the multiple uncoded addresses to generate random encoded addresses on a one-to-one mapping basis. Experiments are performed according to the solution provided in the embodiment of the present invention, and the following experimental data table is obtained:

| Uncoded Address | | | Encoded Address | | |
|---|---|---|---|---|---|
| QID | eDRAM | bank | QID | eDRAM | bank |
| 0 | 0 | 0 | 0 | 0 | 0 |
| 1 | 1 | 0 | 175 | 7 | 5 |
| 2 | 2 | 0 | 350 | 6 | 11 |
| 3 | 3 | 0 | 497 | 1 | 14 |
| 4 | 4 | 0 | 700 | 4 | 7 |
| 5 | 5 | 0 | 531 | 3 | 2 |
| 6 | 6 | 0 | 994 | 2 | 12 |

-continued

| Uncoded Address | | | Encoded Address | | |
|---|---|---|---|---|---|
| QID | eDRAM | bank | QID | eDRAM | bank |
| 7 | 7 | 0 | 845 | 5 | 9 |
| 8 | 0 | 1 | 1401 | 1 | 15 |
| 9 | 1 | 1 | 1494 | 6 | 10 |
| 10 | 2 | 1 | 1063 | 7 | 4 |
| 11 | 3 | 1 | 1160 | 0 | 1 |
| 12 | 4 | 1 | 1989 | 5 | 8 |
| 13 | 5 | 1 | 1898 | 2 | 13 |
| 14 | 6 | 1 | 1691 | 3 | 3 |
| 15 | 7 | 1 | 1588 | 4 | 6 |
| 16 | 0 | 2 | 2802 | 2 | 14 |

It can be seen from the above experimental data table that the banks to which the uncoded addresses belong are distributed regularly, while the banks to which the encoded addresses belong are completely distributed at random when the solution provided in the embodiment of the present invention is adopted. In this way, attacks can be effectively prevented.

Functions of the logic deducing module may also be implemented by fixing the multiple preset transform polynomials on specific hardware.

In the apparatus for encoding a data address according to the embodiment of the present invention, a logic deducing module selects different transform polynomials from multiple preset transform polynomials, and performs an exclusive-OR operation on bits of an uncoded address to obtain an encoded address. By using the solution provided by the present invention, if the uncoded address is N bits, resources of N*N bits are needed to perform an address transform. Compared with the prior art where a $2^N$*N (N indicates the number of bits) bit capacity of an SRAM needs to be occupied when a table in the SRAM is queried, the solution provided in the present invention needs fewer resources and lower costs.

In addition, in the prior art, when a bank conflict is handled, a table is queried according to a one-to-one relationship between uncoded addresses and encoded addresses. As a result, an encoded total address regularly belongs to the same bank, which causes poor anti-attack and anti-interference capabilities. In comparison, by using the solution provided in the embodiment of the present invention, when a bank conflict is handled, an address transform is performed on the N-bit uncoded address according to preset transform polynomials to obtain an encoded address. The experimental data shows that the obtained encoded address is irregular, so attacks can be effectively prevented.

The solution provided in the embodiment of the present invention is applicable to designs that require a large-capacity DRAM, high performance and high reliability, and have an anti-attack demand.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention is subject to the appended claims.

What is claimed is:

1. A method for encoding a data address, comprising:
receiving an uncoded address;
performing an exclusive-OR operation on one or more bits of the uncoded address by using multiple preset transform polynomials, wherein the multiple preset transform polynomials correspond to multiple bits of an encoded address on a one-to-one basis; and
obtaining the encoded address according to a result of the exclusive-OR operation,
wherein when the uncoded address is 17 bits, the multiple preset transform polynomials comprise:
out16=in9^in11^in13^in14^in15^in16;
out15=in8^in10^in12^in13^in14^in15;
out14=in7^in9^in11^in12^in13^in14;
out13=in6^in8^in10^in11^in12^in13;
out12=in5^in7^in9^in10^in11^in12;
out11=in4^in6^in8^in9^in10^in11;
out10=in3^in5^in7^in8^in9^in10;
out9=in2^in4^in6^in7^in8^in9;
out8=in1^in3^in5^in6^in7^in8;
out7=in0^in2^in4^in5^in6^in7;
out6=in1^in3^in4^in5^in6^in9^in11^in13^in14^in15^in16;
out5=in0^in2^in3^in4^in5^in8^in10^in12^in13^in14^in15;
out4=in1^in2^in3^in4^in7^in12^in15^in16;
out3=in0^in1^in2^in3^in6^in11^in14^in15;
out2=in0^in1^in2^in5^in9^in10^in11^in15^in16;
out1=in0^in1^in4^in6^in8^in10^in11^in13^in16, and
out0=in0^in3^in7^in10^in11^in13^in14^in16,
wherein, out I indicates an output value of an $I^{th}$ bit, a value of the I ranges from 0 to 16, in J indicates an input value of a $J^{th}$ bit, and a value of the J ranges from 0 to 16.

2. An apparatus for encoding a data address, comprising:
a receiving unit, configured to receive an input uncoded address; and
a logic deducing module comprising memory and hardware executing a program that configures the deducing module to perform an exclusive-OR operation on one or more bits of the uncoded address by using multiple preset transform polynomials, and obtain an encoded address according to a result of the exclusive-OR operation, wherein the multiple preset transform polynomials correspond to multiple bits of the encoded address on a one-to-one basis,
wherein when the uncoded address is 17 bits, the multiple preset transform polynomials comprise:
out16=in9^in11^in13^in14^in15^in16;
out15=in8^in10^in12^in13^in14^in15;
out14=in7^in9^in11^in12^in13^in14;
out13=in6^in8^in10^in11^in12^in13;
out12=in5^in7^in9^in10^in11^in12;
out11=in4^in6^in8^in9^in10^in11;
out10=in3^in5^in7^in8^in9^in10;
out9=in2^in4^in6^in7^in8^in9;
out8=in1^in3^in5^in6^in7^in8;
out7=in0^in2^in4^in5^in6^in7;
out6=in1^in3^in4^in5^in6^in9^in11^in13^in14^in15^in16;
out5=in0^in2^in3^in4^in5^in8^in10^in12^in13^in14^in15;
out4=in1^in2^in3^in4^in7^in12^in15^in16;
out3=in0^in1^in2^in3^in6^in11^in14^in15;
out2=in0^in1^in2^in5^in9^in10^in11^in15^in16;
out1=in0^in1^in4^in6^in8^in10^in11^in13^in 16; and
out0=in0^in3^in7^in10^in11^in13^in14^in16, where out I indicates an output value of an $I^{th}$ bit, a value of the I ranges from 0 to 16, in J indicates an input value of a $J^{th}$ bit, and a value of the J ranges from 0 to 16.

3. The apparatus for encoding a data address according to claim 2, wherein the multiple preset transform polynomials are statically configured on multiple register arrays in the logic deducing module.

4. The apparatus for encoding a data address according to claim 3, wherein the logic deducing module comprises multiple register arrays, wherein the multiple register arrays correspond to multiple bits of the encoded address on a one-to-on basis; and the register arrays are configured to select a corresponding transform polynomial from the multiple transform polynomials, perform an exclusive-OR operation on one or more bits of the uncoded address, and output a result of the exclusive-OR operation; and the multiple register arrays comprise multiple registers respectively, wherein the registers comprised in each register array correspond to the bits of the uncoded address on a one-to-one basis; and the registers in the multiple register arrays are configured to store corresponding bits of the uncoded address, and output a result of the exclusive-OR operation according to the corresponding transform polynomial.

5. The apparatus for encoding a data address according to claim 4, wherein the logic deducing module is implemented by fixing the multiple preset transform polynomials on specific hardware.

\* \* \* \* \*